June 14, 1966 H. E. WORTZ 3,255,671
CONTROL SYSTEM
Filed April 13, 1964 4 Sheets-Sheet 1

INVENTOR.
HARVEY E. WORTZ
BY
Sheldon F. Raizes
ATTORNEY

June 14, 1966 H. E. WORTZ 3,255,671
CONTROL SYSTEM

Filed April 13, 1964 4 Sheets-Sheet 2

INVENTOR.
HARVEY E. WORTZ
BY
Sheldon F. Raizes
ATTORNEY

June 14, 1966  H. E. WORTZ  3,255,671
CONTROL SYSTEM

Filed April 13, 1964  4 Sheets-Sheet 4

INVENTOR.
HARVEY E. WORTZ
BY
Sheldon F. Raizes
ATTORNEY

United States Patent Office 3,255,671
Patented June 14, 1966

3,255,671
CONTROL SYSTEM
Harvey E. Wortz, St. Joseph, Mich., assignor to The Bendix Corporation, St. Joseph, Mich., a corporation of Delaware
Filed Apr. 13, 1964, Ser. No. 359,173
3 Claims. (Cl. 91—33)

This invention relates to a control system which is capable of automatically controlling a power actuated member or for selectively controlling the power actuated member.

More particularly, this invention relates to an automatic control for regulating the height of a cutting head of a combine. During the operation of a combine for the harvesting of many crops, it is very important to maintain the cutting head as close to the ground as possible to produce a maximum yield of the crop which is being cut. Since in many cases the ground contour varies, it is very difficult for the operator of a combine to maintain the cutting head a minimum distance from the ground to produce maximum crop yield, especially in the case of crops which lie close the ground. In manually operating the controls for the cutting head, the operator will either lift the head too far from or drop the head too close to the ground running the head into the ground resulting in damages of the cutting head and dirt being mixed with the harvested crop in addition to the loss of time while the operator is cleaning out the machine.

Accordingly, it is an object of this invention to produce a control system which will maintain a cutting head of a combine at a predetermined distance from the ground regardless of the contour thereof.

Another object of the invention is to provide a control system for a cutting head on a combine which is not only capable of automatically maintaining the cutting head at a predetermined distance from the ground regardless of the contour thereof, but also which is capable of allowing the automatic control system to be overridden by a manual control system for raising and lowering of the cutting head independently of the automatic control.

It is a further object of the invention to provide a control system for a power operated member which is capable of maintaining a predetermined condition automatically in response to signals imparted to the control system for actuating the same.

It is still a further object of the invention to provide a control system for a power operated member for automatically maintaining a predetermined condition in response to a signal imparted to the control system and which is also capable of overridden by a selective control for selectively operating the power operated member.

Other objects of the invention will become apparent to those skilled in the art from the following description with reference to the drawings, wherein.

Figure 1:
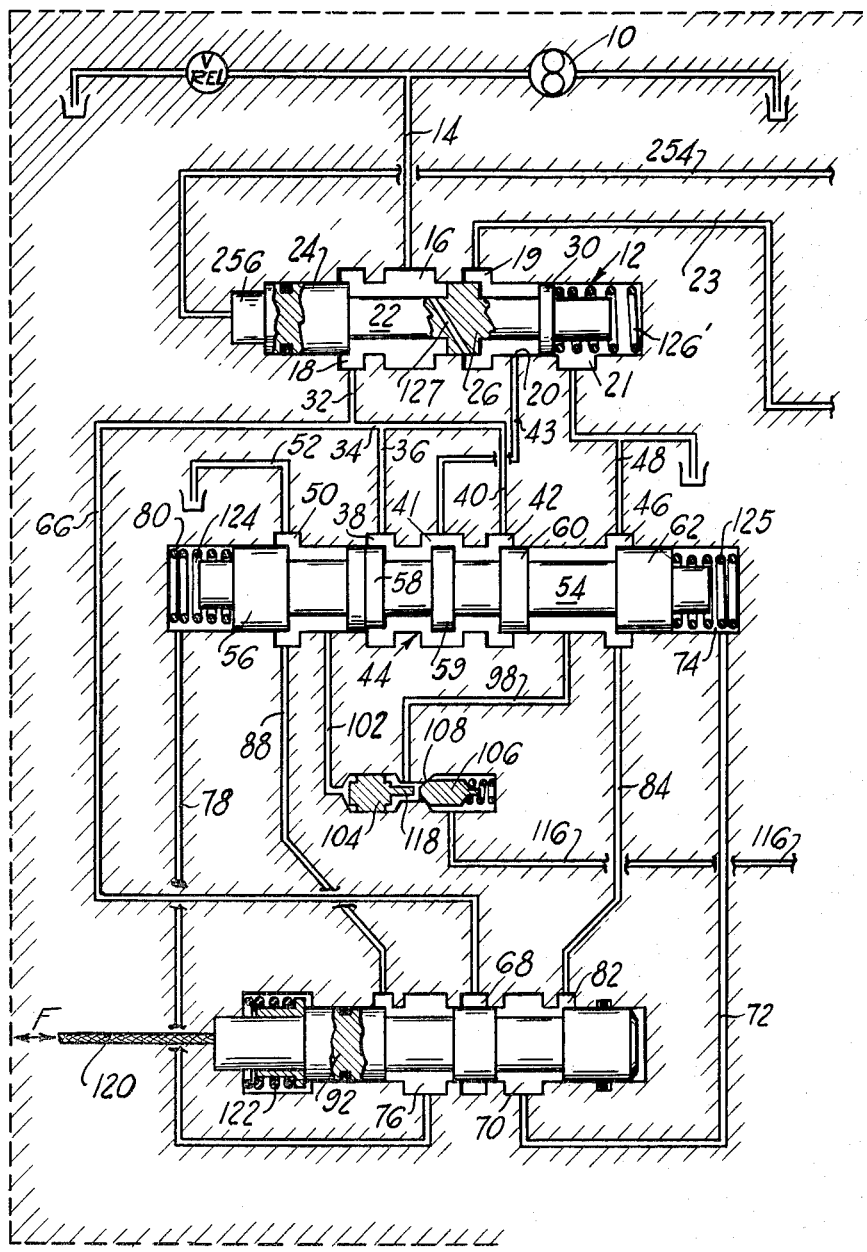
FIGURE 1 illustrates the automatic control system for a power operated member.

Referring to FIGURE 1, a pump 10 is communicated to a pilot operated directional valve 12 by conduit 14. The pilot operated directional valve chamber has an annular pressure inlet groove 16, an annular pressure outlet groove 18, an annular power-beyond outlet groove 19, an annular flow-through inlet grove 20 and a return groove 21. A conduit 23 conducts fluid from the power-beyond groove 19 to other power operated devices on the combine. A spool 22 is slidable within the valve chamber and comprises lands 24, 26 and 30 for communicating the various grooves. Pressure groove 18 is communicated by lines 32, 34 and 36 to an annular pressure inlet groove 38 and by lines 32, 34 and 40 to a second annular pressure inlet groove 42 of a pilot operated control valve 44. The pilot operated control valve chamber also has an annular groove 46 connected by conduit 48 to return, an annular groove 50 connected by conduit 52 to return, and an annular flow-through groove 41 communicated by conduit 43 to a flow-throw inlet port 20 of the directional valve. A spool 54 is slidably received within the chamber and has a plurality of lands 56, 60 and 62 for communicating the various grooves. The pressure conduit 32 is also communicated to a sensing valve 64 by a conduit 66 which communicates with an annular pressure inlet groove 68 of the sensing valve chamber. The sensing valve chamber has an annular pilot groove 70 communicated by a conduit 72 with a chamber 74 at one end of the control valve spool 54 and has a second annular pilot groove communicated by a conduit 78 to a chamber 80 located at the other end of the spool 54 of the control valve 44. The sensing valve chamber also has a return groove 82 communicated with the return groove 46 of the control valve by conduit 84 and also has a second return groove 86 communicated to the return groove 50 of the control valve by conduit 88. A spool 90 is slidable in the sensing valve chamber and has a plurality of lands 92, 94 and 96 for communicating the various grooves therein. That portion of the control valve between the grooves 42 and 46 is communicated by conduit 98 to lockout valve 100 chamber and that portion of the control valve chamber between grooves 38 and 50 is communicated by conduit 102 to the rear of a plunger 104 which forms a portion of the lockout valve. The lockout valve includes a poppet member 106 which is spring biased against a valve seat 108. A plurality of hydraulic rams 110 are communicated to the lockout valve 100 by conduit 112 and conduit 116 which enters the lockout valve chamber on one side of the valve seat 108. Conduit 98 enters the lockout valve chamber on the other side of seat 108 and is communicated with conduit 116 when the reciprocable valve member 106 is unseated from the valve seat 108 and cut off from communication with the conduit 116 when the valve member 106 is seated on the valve seat 108. The plunger 104 is responsive to pressure in conduit 102 to slide toward the poppet 106 for engaging its stem 118 with the valve member 106 to unseat the same. The hydraulic rams 110 are attached to a combine cutting head or grain table for lifting or lowering the same.

The position of the directional valve 12 determines whether or not the position control of the rams is automatically controlled or manually controlled. A spring 126 biases the spool 22 to the left against a shoulder 128 into the position as shown in FIGURE 1 which is automatic control position. The pilot operated control valve spool 54 is illustrated in its neutral position and the sensing valve spool 94 is shown in its neutral position. The sensing valve spool 90 is connected to a cable 120 which may be connected to any well known feeler (not shown) mounted on a combine (not shown) for sensing the contour of the ground. The feeler motion will either tension the cable 120 which in turn exerts a force on the valve member 90 to shift the same to the left or will loosen cable 120 permitting a spring 122, acting on the spool member 90, to shift the spool member 90 to the right. Springs 124 and 125 act with equal force in opposite directions on the control valve spool 54 for maintaining the same in a neutral position.

*Operation of automatic control system*

Assuming that the directional valve is in automatic control position and that the control valve and sensing valve are in neutral position, flow will be communicated from the pump 10 by the conduit 14 to the inlet groove 16 out the outlet groove 18 of the directional valve to conduits 32, 34 and then split into conduits 36 and 40 and into inlet grooves 38 and 42, respectively, of the pilot operated control valve. Flow from the inlet grooves 38 and 42 is then communicated to the flow-through groove 41, conduit 43, the flow-through inlet port 20, power-beyond groove 19 and conduit 23 to other power operated devices on the combine. System back pressure is communicated from the outlet groove 18 by the conduits 32 and 66 to the pressure inlet groove 68 of the sensing valve 64. Conduit 102 is communicated to the return groove 50, and conduit 98 is communicated to the return groove 46 thereby permitting the valve member 106 to be seated on the valve seat 108, in response to pressure at the hydraulic rams acting on the valve member 106, thereby locking the pressure at the hydraulic rams.

The pilot operating chamber 74 is communicated to return via conduit 72, groove 70, groove 82, conduit 84, groove 46 and conduit 48. The pilot operating chamber 80 is also communicated to return via conduit 78, groove 76, groove 86, conduit 88, groove 50 and conduit 52.

Assuming that the cable 120 is tensioned to shift the spool valve member 90 to the left, pressure line 66 will be communicated with conduit 72 thereby introducing pressure into the chamber 74, thereby shifting the control valve spool 54 to the left resulting in communication between the inlet conduit 40 and the conduit 98. The introduction of fluid into the conduit 98 will result in the fluid unseating the poppet member 106 and being conducted to the hydraulic rams 110 to raise the same. Lands 59 and 60 cut off communication between the pressure inlet grooves 38, 42 and the flow-through groove 41, but a cross bore 127 is located in the spool 22 to maintain a minimum amount of flow between the pressure inlet groove 16 and the power-beyond groove 19. As the hydraulic ram 110 is lifted, the cable 120 will be slackened, permitting the spring 122 to return the sensing spool 90 to neutral position whereby pressure will be reduced in conduit 72 and the chamber 74 permitting spring 124 to shift the spool 54 to the right until land 62 uncovers groove 46 to communicate the chamber 74 to return at which time the spool 54 will be shifted to neutral position by the spring 124.

Assuming that the cable 120 is slackened by the feelers, the spring 122 will shift the slidable spool 90 to the right communicating the pressure groove 68 with the pilot groove 76 and thereby introduces pressure into the chamber 80 resulting in shifting the control valve spool 54 to the right. When the spool 54 is shifted to the right, the pressure inlet groove 38 is communicated to the conduit 102 resulting in the introduction of fluid to the conduit 102 thereby shifting the plunger 104 to the right and unseating valve 106 resulting in communication between the conduit 116 and conduit 98. Conduit 98 is now communicated to the return groove 46 permitting fluid to be released from the hydraulic ram 110 to return and allowing the cutting head or grain table to lower. Lands 58 and 59 cut off communication between the inlet grooves 38, 42 and the flow-through groove 41, but again the cross bore 127 in the spool valve member 22 communicates the pressure inlet groove 16 with the power-beyond groove 19 permitting a minimum amount of flow to the other power operated members on the combine. Land 58 is stepped permitting more than a normal amount of leakage therepast allowing only a sufficient build up of pressure at the rear of plunger 104 to hold the poppet 106 open. As the hydraulic rams 110 are lowered, the cable 120 will be tensioned resulting in shifting the sensing spool valve 90 back to neutral position. When the spool valve 90 is returned to neutral position, the pressure in conduit 78 and therefore in chamber 80 is reduced permitting spring 125 to return the spool 54 to the left whereby land 56 will uncover return groove 50 to communicate chamber 80 to return, at which time spring 125 returns spool 54 to neutral. As the control valve spool 54 is returning to neutral position, conduit 102 is communicated to the return groove 50 dumping pressure from behind the plunger 104 and the conduit 98 remains communicated to the return groove 46 thereby permitting the pressure at the hydraulic rams to close the valve member 106 on its seat 108 to lock in the pressure at the hydraulic rams.

*Manual control*

Figure 2:
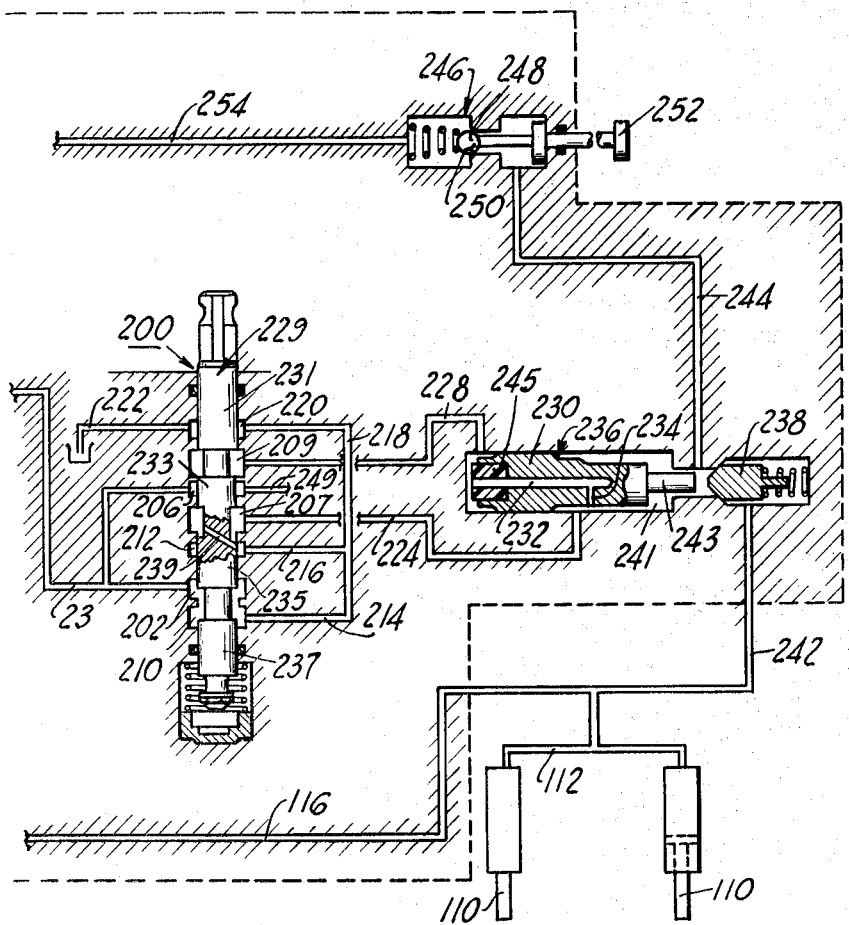
FIGURE 2 illustrates one embodiment of the manual control which is to be used in conjunction with the automatic control of FIGURE 1.

Looking in particular to FIGURE 2, there is illustrated the manual control valve 200. The control valve has an annular pressure inlet groove 202 communicated with the power-beyond conduit 21 by conduit 204 and a second annular pressure inlet groove 206 communicated with the power-beyond conduit 23 by conduit 208. Grooves 210 and 212 are communicated by the conduits 214 and 216, respectively, by a common conduit 218 to an annular groove 220 which is communicated by conduit 222 to return. The control valve 200 also has an annular groove 207 communicated by conduit 224 to a lockout valve 226 chamber and an annular groove 209 communicated by conduit 228 to the rear of a plunger 230 of the lockout valve 226.

A spool 229 is slidable within the control valve chamber and has a plurality of lands 231, 233, 235 and 237 for communicating the various grooves. A cross bore 239 is located on the spool 229 and opens at one end in the annular space between the lands 233 and 235 and opens at its other end at the outer peripheral edge of land 235.

The plunger 230 has an axial passage 232 therethrough which is intersected by a restricted radial passage 234 communicating with an annular space in front of a metering land 236. An annular sealing member 245 is located on the rear of the plunger for engaging the rear wall of the lockout valve chamber to cut off communication between the passages 228 and 234. The lockout valve 226 also comprises a poppet member 238 which is spring biased into engagement with a seat 240. The plunger has a stem 243 for engaging the valve member 238 for unseating the same. The hydraulic rams 110 are communicated to the lockout valve 226 to conduit 112, and conduit 242 which enters the lockout valve 226 chamber on one side of the seat 240. The lockout valve communicates the chamber 241 with conduit 242 when the poppet 238 is unseated and cuts off communication therebetween when the valve member 238 is seated. When the manual control valve 200 is in neutral position, the rear of plunger 230 is cut off from the pressure inlet groove 206 and the return groove 220, the chamber 241 and conduit 224 are communicated by cross bore 239 to return groove 212, pressure inlet groove 202 is communicated to return groove 212, pressure inlet groove 202 is communicated to return groove 210.

In operation, assuming the combine operator wishes to raise the cutting head or grain table manually, he can raise the slidable valve spool 229 to cut off groove 202 from groove 210 by land 237 and communicate inlet groove 206 with pressure outlet groove 207 to introduce fluid to conduit 224 which is then communicated to the lockout valve chamber forcing the plunger 230 rearwardly, whereby member 245 cuts off communication between the passages 228 and 234, and forcing the poppet 238 off the seat 240. Fluid is then conducted by conduit 242, chamber 114, and conduit 112 to the power rams 110 to raise the same. At the same time land 231 opens groove 209 and conduit 228 to return through groove 220 and conduit 222. When the cutting head has reached the position desired, the operated will shift the valve spool 229 back to neutral position whereby conduit 224 and chamber 241 are communicated to the return port groove 212 by the cross bore 239 resulting in the pressure at the hydraulic rams 110 seating valve members 238 and locking pressure therein. If the operator desires to lower the ram, then he will depress the valve spool from neutral position and communicate pressure inlet groove 206 with the groove 209 communicating pressure to conduit 228 and introducing pressure behind the plunger 230 to shift the same forward and unseat the valve member 238. Land 235 communicates groove 207 with the return groove 216 permitting fluid to be displaced from the ram 110 through conduit 242, chamber 241, conduit 224, grooves 207, 212; conduits 216, 218; groove 220 and conduit 222 to return. Metering land 236 of plunger 230 meters the flow of fluid from the rams to passage 224. At the same time, land 235 cuts off communication between the return groove 210 and the pressure inlet groove 202. When the cutting head is lowered to the desired height, then the combine operator shifts the valve spool 229 back to neutral position. Fluid which is trapped behind the plunger 230 is exhausted through passages 232, 234, conduit 224, groove 207, cross bore 239 and out through return groove 216 thereby permitting poppet 238 to be closed by pressure at the rams 110. The cross bore 239 acts to "snub" seating of poppet 238. Further details of the snubbing action may be found in U.S. Patent No. 2,868,174 (common assignee). A conduit 249 leads from pressure groove 206 to other power control valves (not shown) which may be of a type similar to control valve 200. The other control valves will have lands and grooves located in conduit 214 and in series with grooves 202 and 210, capable of closing off conduit 214 from return line 218 to effect back pressure at groove 206 and conduit 249 and will also have lands and grooves in parallel with the groove 206 to communicate fluid under pressure to their respective power operated members. The manual control valve 200 and the lockout valve 226 arrangement is currently used on production combines and no claim is being made to this arrangement, per se.

*Manual and automatic hookup*

It is desirable to interconnect the automatic system with the manual control system so that the manual control will override the automatic control. This is done by providing a passage or conduit 244 which leads from the chamber 241 to a check valve 246 which comprises a poppet 248 which is biased against a seat 250 and also comprises a release member 252 which upon depression thereof is adapted to engage the poppet 248 to unseat the same. Conduit 254 communicates with a pilot operating chamber 256 of the pilot operated directional valve 12 and is in communication with the conduit 244 when the poppet 248 is unseated.

Assuming that one wishes to utilize the manual control to override the automatic control, the operator will shift the manual control spool from neutral position to either lifting or lowering position whereby fluid pressure will build up in line 244 unseating poppet 248 and conduit 254 and chamber 256 will be pressurized resulting in shifting the pilot operated directional spool 22 against the force of the spring 126 to manual control position. Pressure in line 254 will be locked in by the check valve and poppet 248 maintaining the spool 22 in the aforesaid position. With the spool shifted to the manual control, the inlet line 14 will be communicated to the power-beyond groove 19 and cut off from conduit 32. At the same time, the flow-through groove 41 and conduit 43 will be communicated to return groove 21. Therefore, no fluid flow will be communicated to the automatic control valve or sensing valve. When the operator wishes to switch back to the automatic control system, all he has to do is to return the manual control to neutral, wherein the conduit 244 is communicated to exhaust, and then depress the actuator 252 to open the check valve 246 and relieve the pressure in chamber 256 resulting in the spring 126 returning the directional valve spool 22 back to automatic control position whereby inlet pressure will be again communicated to line 32 to place the control valve in a condition responsive to signals from the sensing valve 64. This embodiment may be manufactured within the combine.

Figure 3:
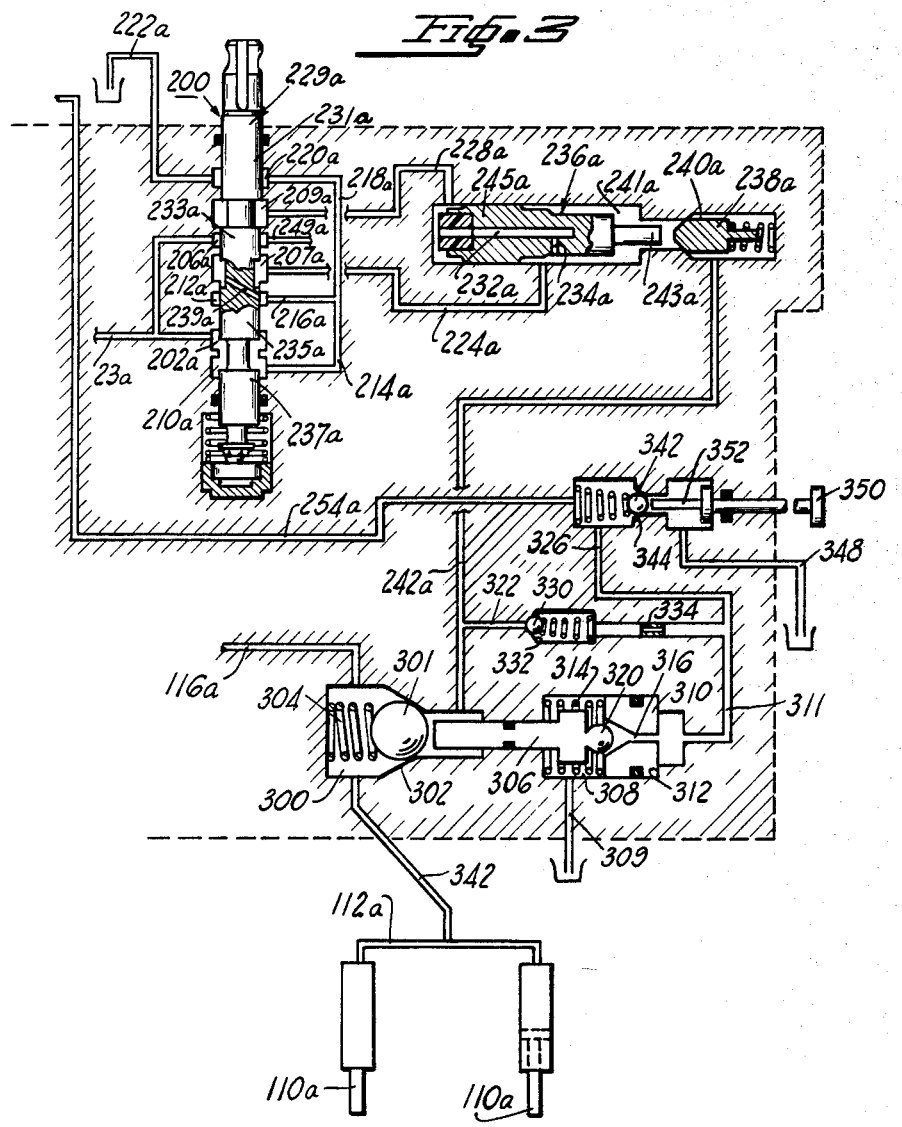
FIGURE 3 is a view of another embodiment of a manual control which is to be used in conjunction with the automatic control system of FIGURE 1.

The embodiment of FIGURE 3 illustrates an adapting unit which must be attached to a combine, which has been manufactured with only a manual control, for the purpose of converting the combine to the automatic control system and wherein the manual control may override the automatic control. Those elements which are the same as in the previous embodiment and illustrated in this figure are given the same reference numerals with an "a" affixed thereto. Conduits 242a, 112a, and 116a are communicated with a valve chamber 300. A ball poppet 301 is located in chamber 300 and is biased against a seat 302 by a spring 304.

A slidable plunger 306 has one end extending into the chamber 300 for engaging the ball 301 to unseat the same and has its other end extending into a chamber 308 which is communicated to return by conduit 309 and to a conduit 311. A slidable valve seat 310 is located in the chamber 308 and is biased against a shoulder 312 by a spring 314. The valve seat 310 has a central passage 316 terminating in an annular conical surface 318 for engaging the rounded end 320 of a plunger 306 for sealing off passage 315 and conduit 311 from conduit 309. Conduit 322 communicates with the conduit 242a and with the conduit 311 and a conduit 326. The conduit 326 communicates directly with conduit 254a. The passage 316 in the valve seat 310 communicates conduits 311 and 309 in the open position as shown and communication therebetween is cut off when the valve seat 310 engages the rounded portion 320 of plunger 306. A ball poppet check valve 330 is adapted to engage the valve seat 332 in the passage 322 and a restriction 334 is also arranged in the conduit 322. A valve 340 is provided for converting the control of the rams 110a from manual to automatic. The valve 340 comprises a poppet member 342 located on one side of and biased against a seat 344 by spring 346. A conduit 348 communicates the other side of the seat 344 with return. A plunger 350 may be manually depressed to engage the stem 352 with the poppet member 342 for unseating the same for communicating conduits 326 and chamber 256 with return conduit 348.

In operation, during the automatic control, fluid under pressure is trapped in conduits 116a, chamber 300 and conduit 112a and biases the ball 301 against the seat 302. If the combine operator wishes to switch to manual control, he actuates the manual control valve 200a from neutral position into lifting condition whereby the poppet 238a will be opened by pressure from conduit 224a. Fluid will unseat the poppet 301 thereby communicating lines 242a and 112a. Fluid will also flow past the check valve 330 into line 311 and act on the slidable valve seat 310 to move the same against the round end 320 to seal off communication between the passages 311 and 309, whereby the valve seat 310 urges the plunger 306 to the left maintaining the ball poppet 301 off of its seat and communicating passage 242a with conduit 112a. The same pressure in conduit 311 will be also communicated by conduit 326 to conduit 254 to actuate the slidable pilot operated directional valve spool 22 to the right into manual position. The poppet member 342 is biased against the seat 344 by pressure in conduits 326 and 254a. When line 242a is communicated to return by manual control valve 200a, the pressure in conduits 311 and 326 acts on the check valve 330 to prevent communication between the conduits 311 and 326 and the conduit 242a, thereby trapping fluid under pressure in the conduits 311, 326 and 254a as long as the poppet 342 remains in closed position. Thus, the poppet valve 301 will be locked in an unseated position and communication between the conduit 242a and the power rams 110a will be maintained at all times until the convertor valve 342 is opened whereby pressure in conduits 254, 326, and 324 is communicated to return. Upon communication of conduits 311, 326 and 254a to return, the spring 314 will return the valve seat 310 against the shoulder 312 allowing pressure at the rams and the spring 304 to engage ball valve 301 against its seat 302, closing off communication between conduits 242a and 112a. Upon the release of pressure in chamber 256, the pilot operational directional valve will be returned by the spring 126a to automatic control position. The only communication of conduits 242a, 254a, 326 and 311 to the reservoir is through passage 316 in the slidable valve seat 310 and conduit 309. This communication is placed in the system since there will be some leakage of pressure at the power ram, past the ball valve 301 into the conduit 242a. If there were no communication to the reservoir, pressure could build up in the conduits thereby actuating the slidable valve seat 310, to unseat the ball valve 301, and also actuating the slidable valve spool 22 of the pilot operated directional valve to the manual control position.

Figure 4:
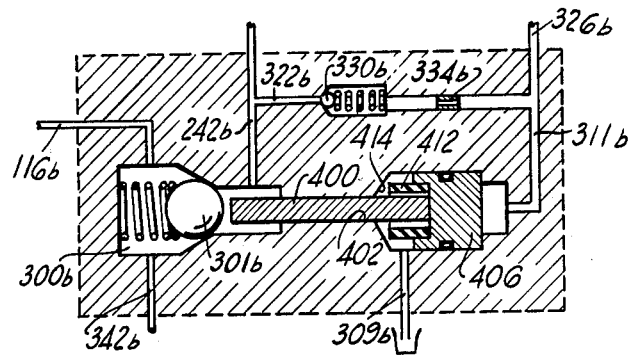
FIGURE 4 is a modification of one valve arrangement illustrated in FIGURE 3.

Referring to FIGURE 4, a modification of the lockout valve 301, 306, 310 is illustrated therein. Those elements which are the same as in the previous embodiments are given the same reference numerals with a "b" affixed thereto. The plunger in this instance comprises a pin 400 slidable in an opening 402 in the wall 404 which separates the chambers 300b and 308b. One end of the pin 400 is adapted to engage the ball 301b and the other end thereof is adapted to engage a piston 406. An O-ring 408 is located on the piston and engages the wall of the chamber 308a to seal the rear face 410 of the piston from the front thereof. An annular sealing member 412 is secured to the front of the piston 406 and is adapted to engage a conical seat 414. A leakage path is formed between the pin 400 and the wall of the opening 402 to communicate fluid leaking from the rams 110b past the ball 301b to the return conduit 309. When pressure is introduced into conduit 311b and behind the piston 406, the piston forces the pin to the left to hold the ball 301b in open position. At the same time, the leakage path between the pin 400 and the wall of opening 402 is sealed off from the return conduit 309 by the engagement of member 412 with its seat 414.

Figure 5:
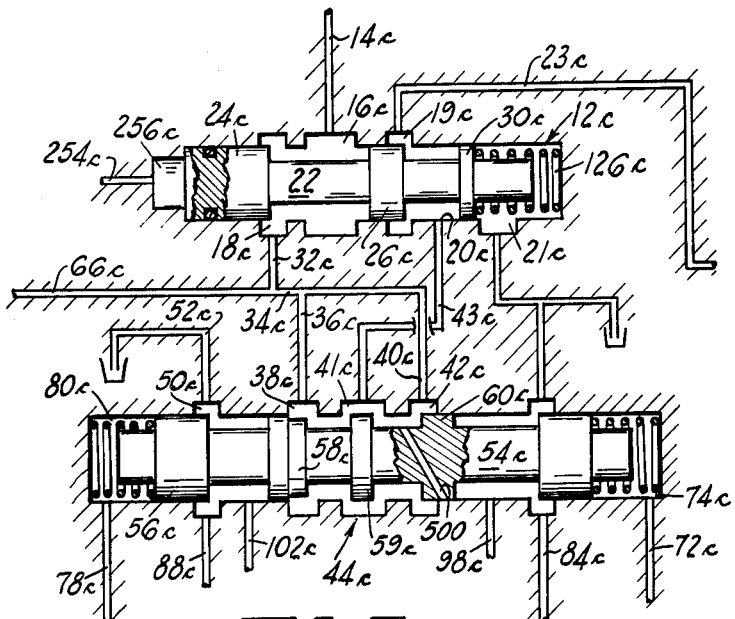
FIGURE 5 is a modification of several valve spools illustrated in FIGURE 1.

Referring to FIGURE 5, a modification of the directional valve and control valve of FIGURE 1 is illustrated. Those elements which are the same as the elements in FIGURE 1 are given the same reference numerals with a "c" affixed thereto. In essence, the cross bore 127 in spool 22 has been replaced by a cross bore 500 in spool 54c. The cross bore 500 communicates limited flow between the inlet groove 42c and flow-through groove 41 when spool 54c is shifted to the right and maintains limited flow between the inlet groove 38 and the flow-through port when the spool 54c is shifted to the left. The cross bore in spool 22 assured communication between the pump 10 and the power-beyond line 254 at all positions of the spool 22. With the cross bore in spool 54c, land 26c of spool 22c laps power-beyond groove 19 when the spool 54c is in transit from automatic position to manual position. If the valve spool 22c happens to stick at that point, the pump will be cut off from the power-beyond port. The cross bore in valve spool 22 is desirable for this reason, but alternatively it is acceptable in spool 54c.

It is intended that such revisions and variations of the invention, which incorporate the herein disclosed principles, as are reasonably to be expected on the part of those skilled in the art will be included within the scope of the following claims.

I claim:

1. In a control system: power operated means; a pressure source; a reservoir; control valve means communicated with said pressure source and with said reservoir; lockout valve means comprising a first valve element and a second element; convertor valve means communicated with said reservoir; said convertor valve means, said second element, said first valve element and said control valve means being communicated with each other; said powere operated means being communicated with said first valve element; said first valve element being arranged to communicate said control valve means with said power operated means in open position and to cut off communication therebetween when in closed position; said first valve element being arranged to be urged into closed position by pressure at said power operated means; said second element being arranged to engage said first valve element to open position in response to pressure communicated to said second element from said pressure source past said control valve means; check valve means arranged in closed position to cut off said first valve element and said control valve means from communication with said second element and said convertor valve means; said check valve means being arranged to be urged to closed position by pressure at said second element and arranged to be urged to an open position by pressure communicated to said power operated means from said pressure source past said control valve means; said convertor valve means being arranged to communicate said second valve element to said reservoir in open position and to cut off said last named communication in closed position; said convertor valve means being normally closed; said control valve means in one operating position communicating said pressure source with said one valve element, said check valve means and said second element, in another operating position communicating said first valve element and thereby said power operated means with said reservoir whereby pressure is trapped at said second element maintaining said first valve element in open position, and in neutral position cutting off said last two named communications; and means for opening said convertor valve means.

2. In a control system: power operated means; a pressure source; a reservoir; a pilot operated valve communicated with said pressure source; control valve means communicated with said pilot operated valve and communicated with said reservoir; said pilot operated valve communicating said pressure source to said control valve means; lockout valve means comprising a first valve element and a second element; convertor valve means communicated with said reservoir; said pilot operated valve having a pilot operating chamber; said convertor valve means, said pilot operated valve means chamber, said second element, said first valve e'ement and said control valve means being communicated with each other; said power operated means being communicated with said first valve element; said first valve element being arranged to communicate said control valve means with said power operated means in open position and to cut off communication therebetween when in closed position; said first valve element being arranged to be urged into closed position by pressure at said power operated means; said second element being arranged to engage said first valve element to open position in response to pressure communicated to said second element from said pressure source past said pilot operated valve and said control valve means; check valve means arranged in closed position to cut off said first valve element and said control valve means from communication with said second element, said convertor valve means and said pilot operating chamber; said check valve means being arranged to be urged to closed position by pressure at said second element and arranged to be urged to an open position by pressure communicated to said power operated means from said pressure source past said control valve means;

said pilot operated valve being responsive to pressure at said piloting operating chamber thereof to move from one position thereof to another position thereof; said convertor valve means being arranged to communicate said pilot operating chamber and said second valve element to said reservoir in open position and to cut off said last named communication in closed position; said convertor valve means being normally closed; said control valve means in one operating position communicating said pressure source with said one valve element, said check valve means, said second element, and said pilot operating chamber, in another operating position communicating said first valve element and thereby said power operated means with said reservoir whereby pressure is trapped at said second element and said pilot operating chamber of said pilot operated valve, to maintain said first valve element in open position and maintain said pilot operated valve in said another position, and in neutral position cutting off said last two named communications; and means for opening said convertor valve means.

3. The structure as recited in claim 2 further comprising: second control valve means communicated with said pilot operated valve; said second control valve means being communicated with said power operated means for controlling the same; said pilot operated valve communicating said pressure source to said second control valve means when in said one position for operating said second control valve means; said pilot operated valve cutting off said pressure source from said second control valve means in said another position to render said second control valve means inoperative.

References Cited by the Examiner

UNITED STATES PATENTS

| | | | |
|---|---|---|---|
| 2,696,827 | 12/1954 | Deardorff | 91—33 |
| 3,000,361 | 10/1961 | Delany | 91—33 |
| 3,012,403 | 12/1961 | Westcott | 91—33 |
| 3,101,187 | 8/1963 | Campbell | 251—63 |
| 3,150,857 | 9/1964 | Molloy | 251—63 |
| 3,158,179 | 11/1964 | Lehmann | 137—627.5 |
| 3,168,906 | 2/1965 | Brown | 137—627.5 |

SAMUEL LEVINE, *Primary Examiner.*

P. T. CORBIN, *Assistant Examiner.*